April 18, 1933.    H. STINTZING ET AL    1,904,392
JOINT FOR MEMBERS PROVIDED IN A WALL SEPARATING
SPACES OF DIFFERENT PRESSURE
Filed June 10, 1929    2 Sheets-Sheet 2
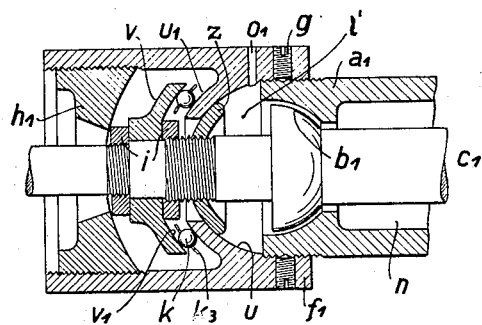
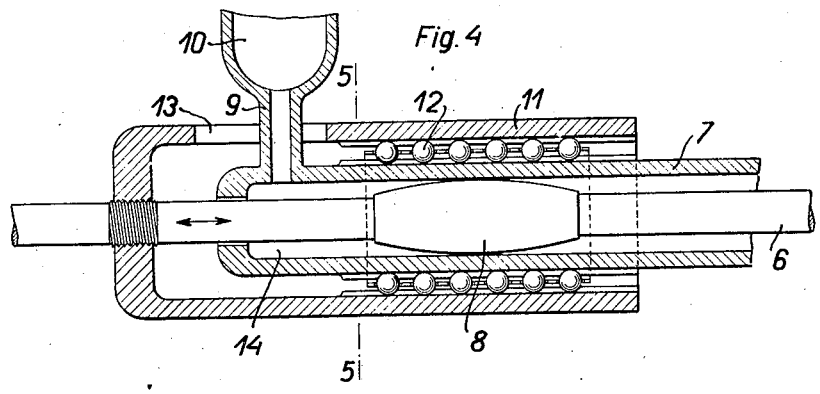
Fig. 4
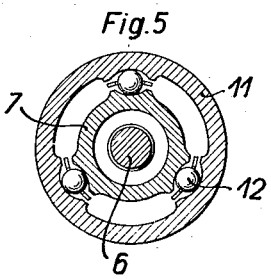
Fig. 5
Inventors:
Hugo Stintzing
Eugen Huber
by Franz Reichardt
Attorney Patented Apr. 18, 1933

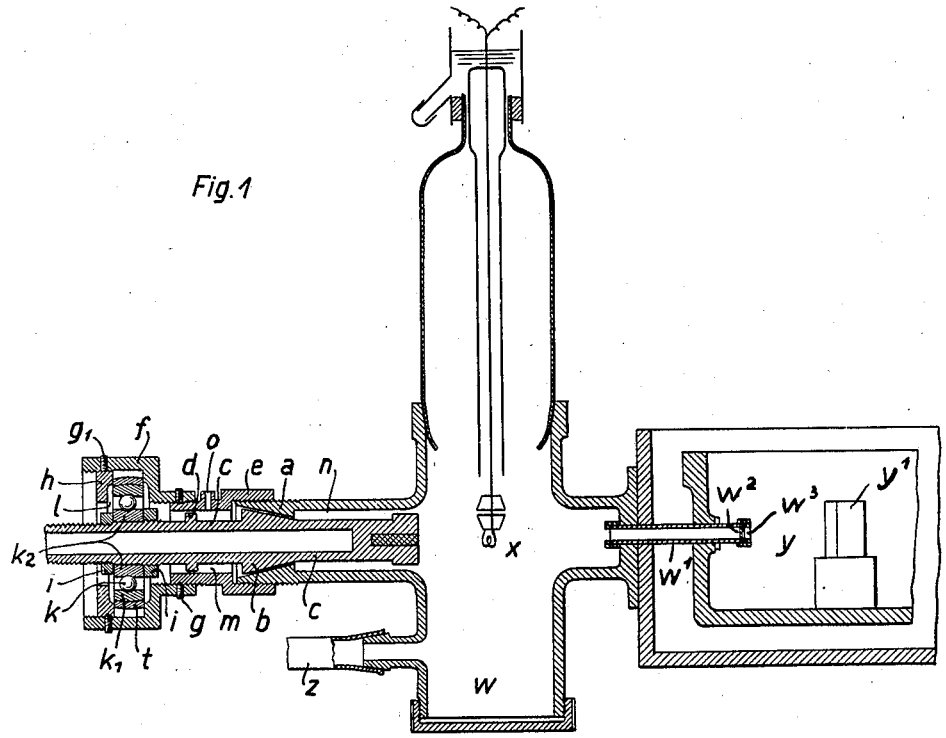
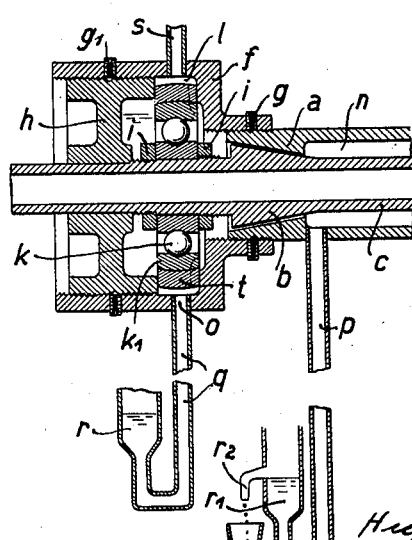

1,904,392

UNITED STATES PATENT OFFICE

HUGO STINTZING, OF GIESSEN, AND EUGEN HUBER, OF FRANKFORT-ON-THE-MAIN, GERMANY

JOINT FOR MEMBERS PROVIDED IN A WALL SEPARATING SPACES OF DIFFERENT PRESSURES

Application filed June 10, 1929, Serial No. 369,783, and in Germany December 24, 1927.

Our invention relates to improvements in joints for members extending through a wall separating spaces of different pressures, such as cocks, valves, or operating members passed through the wall from one space into the other. In one embodiment the invention is used in connection with receptacles exposed to high vacuum such for example as Röntgen tubes. The object of the improvements is to provide a joint by means of which the said members are tightened on or within the wall so that they are capable of being moved without the resistance to such movement being unduly increased by the differential pressure acting thereon, and with this object in view our invention consists in providing means for supporting the said member a small distance away from its seat and filling the small space thus produced with a suitable liquid or viscous packing medium such as fat, mercury, etc. We have discovered that the said packing medium is not practically drawn by suction into the space of lower pressure. A packing medium of high viscosity suitable for high vacuum devices is Ramsay fat, which is a highly viscous fat containing crude caoutchouc. However, in order to avoid a failure of the packing medium even in exceptional cases, the closing member is disposed within a casing containing a certain amount of the packing medium and having a supply thereof from without in case of need.

For the purpose of explaining the invention several examples embodying the same have been shown in the accompanying drawings, in which Fig. 1 is a sectional elevation of a Röntgen tube used for spectrographic analyses, the Röntgen tube being provided with a rod rotatably passed through the wall thereof and carrying the chemical matter to be examined, Fig. 2 is a sectional elevation showing a modification of the bearing of the rod shown in Fig. 1, the packing medium for the said rod being mercury, Fig. 3 is a similar sectional elevation showing a modification suitable for use in connection with members having spherical packing surfaces, Fig. 4 is a sectional elevation showing a rod capable of longitudinal movement, and Fig. 5 is a sectional elevation taken on the line 5—5 of Fig. 4.

Our improved joint may be used for example in vacuum devices used for various purposes, and in order that the invention be more clearly understood we have shown, in Fig. 1, a Röntgen tube of the construction shown and described by us in the periodical: Physikalische Zeitschrift, 27th volume, 1926, pages 844 to 853.

The Röntgen tube described in the said periodical is used in chemical analysis by means of Röntgen rays. The tube $w$ contains a cathode $x$, a rotatable anode $c$, and a spectrograph $y$ having a crystal $y^1$, the Röntgen rays emanating from the anode $c$ passing through a pipe $w^1$, an aluminum disk $w^2$ and a slotted diaphragm $w^3$. The matter to be tested is placed on the inner end of the anode $c$ which for this purpose is provided with a longitudinal bore. While examining the matter the anode is rotated about its longitudinal axis in order that continuously new parts of the matter be exposed to the cathode rays emanating from the cathode $x$. To the pipe $z$ a vacuum pump is connected. The rays are reflected by the crystal at different angles, according to the character of the matter being tested, and from the angle of reflection the character of the matter is ascertained.

The vacuum device is provided with a tubular extension $n$ having at its end a conical seat $a$. Through the said tubular extension the anode in the form of a rod $c$ is passed into the device. The rod $c$ is formed with a conical collar $b$ exactly fitting on the conical seat $a$ of the tubular extension. Screwing on the tubular extension is a sleeve $e$ providing an annular chamber $m$ between the same and the rod $c$, the said chamber being bounded at its outer end by a collar $d$ formed on the rod $c$ and being accessible from without through an opening $o$ for supplying the packing medium thereto. On the outer end of the sleeve $e$ a cylindrical cap $f$ is screwed, which cap is adapted to be fixed in position by means of screws $g$. Within the cap there is an anti-friction bearing adapted to relieve the seat $a$ of the pressure of the conical collar $b$, and as shown, the said anti-friction bearing consists of a ring $t$ bearing on the inner face of the cap $f$ and having a spherical inner face, race rings $k^1$ and $k^2$ mounted respectively in the ring $t$ and on the rod $c$, and balls $k$, the race ring $k^2$ being fixed in position on the rod $c$ by means of a pair of ring nuts $i$ screwing on the rod $c$. The ring $t$ is held in position by means of a ring $h$ screwing in the cap $f$ and fixed in position by means of screws $g^1$. As shown the inner face of the cap $f$ is formed with a recess permitting rocking movement of the race ring $k^1$ within the ring $t$.

The rod $c$ is fitted within the extension $n$ and with its conical collar $b$ on the seat $a$ as follows:

The conical collar $b$ and the seat $a$ are coated with a thin layer of a suitable viscous matter such as fat, and the rod $c$ is passed into the tubular extension $n$ with the collar $b$ engaging the seat $a$. The annular space $m$ around the rod $c$ between the collars $b$ and $d$ is filled with the said fat, and the sleeve $e$ is passed on the rod $c$ and screwed on the tubular extension $n$. The cap $f$ is screwed on the sleeve $e$, and the anti-friction bearing $k^2$ is set on the rod by means of the rings $i, i$ so that there is a slight clearance between the right hand end face of the ring $t$ and the corresponding face of the cap $f$. Now vacuum is produced within the receptacle carrying the tubular extension $n$, and the rod $c$ is rotated. After several rotations of the rod the cap $f$ is screwed outwardly by hand until the attendant feels that it has just engaged the ring $t$, and that it is about to raise the conical collar $b$ from the packing of the seat $a$. Now the screws $g$ are screwed inwardly for fixing the cap $f$ in position, and the ring $h$ is screwed into the cap $f$ and into engagement with the ring $t$ for clamping the same in position, whereupon the screws $g^1$ are screwed inwardly. Now the rod $c$ can be operated any length of time, and from time to time a new supply of fat preferably in a warm state is poured into the chamber $m$ through the opening $o$. In the practice of the invention we prefer initially to heat the mass of fat within the chamber $m$, care being taken that the layer of fat confined between the seat $a$ and the collar $b$ be kept in a viscous state by cooling.

By supporting the rod $c$ in the manner described the collar $b$ is held a slight distance away from the seat $a$, and the gap thus provided is filled with the packing medium. Thus the collar floats within the said packing medium, so that the rod $c$ can be readily rotated.

Fig. 2 shows a modification in which mercury is used as a packing medium. The construction of the apparatus is similar to the one illustrated in Fig. 1, and similar letters of reference have been used to indicate corresponding parts. The sleeve $e$ has been dispensed with, and the cap $f$ screws directly on the tubular extension $n$ and it is adapted to be fixed in position thereon by means of the screws $g$. The ring $t$ containing the anti-friction bearing is fixed in position by means of a solid lid $h$. As a packing medium mercury is used which is supplied to the chamber $l$ and the left-hand side of the collar $b$ and seat $a$ through an opening $o$ from a pipe $q$ communicating with a container $r$ for mercury, the said mercury being taken into the chamber $l$ by means of a vacuum pump connected to the chamber by a pipe $s$. The tubular extension $n$ communicates with a pipe $p$ ending in a receptacle $r^1$ and adapted to collect any mercury which might be drawn into the extension $n$ through the gap provided between the seat $a$ and the cone $b$. From the receptacle $r^1$ the mercury is poured into the receptacle $r$. $r^2$ is an overflow.

The operation of the apparatus and the manner of fitting the cone $b$ in position is the same as has been described with reference to Fig. 1.

The invention may be used in connection with members having rocking movement, as is shown in the modification illustrated in Fig. 3. As shown in the said modification the tubular extension $n$ of the vacuum device is provided with a spherical concave seat $a^1$ engaged by a spherical collar $b^1$ of the rod $c^1$. Screwing on the extension $n$ is a sleeve $f^1$ formed internally with a flange $u$ providing a spherical seat $u^1$ disposed concentrically of the seat $a^1$. On the rod $c^1$ a ring $v$ is adjustable in a similar way as the inner race ring $k^2$ of the anti-friction bearing shown in Figs. 1 and 2, and the said ring is formed with a spherical bearing face $v^1$ disposed concentrically of the seats $a^1$ and $u^1$. Between the seats $u^1$ and $v^1$ there are balls $k$ held together by a cage $k^3$. The sleeve $f^1$ is closed at its outer end by a ring $h^1$ having a spherical inner face engaging the outer ring $i$. The packing medium such as fat is supplied through a bore $o^1$ and it is confined between the flange $u$ and the collar $b^1$ by a ring $z$.

For assembling the device shown in Fig. 3 the collar $b^1$ and the seat $a^1$ are coated with fat, the rod $c^1$ bearing the small spherically curved ring $z$ is passed into the extension $n$ with its collar $b^1$ bearing on the seat $a^1$, the sleeve $f^1$ is screwed on the extension $n$, the ring $v$ and the set of balls $k$ are mounted on the rod $c^1$, the ring $h^1$ is screwed into the sleeve $f^1$, and the space $l^1$ is filled with the packing medium. Now the rod $c^1$ is operated while producing the vacuum within the vacuum device. When the attendant finds that the collar $b^1$ begins to stick on the seat $a^1$ he stops the operation of the rod, and he screws the sleeve $f^1$ rearwardly until he finds that the ring $u$ bears on the balls $k$ thus relieving the pressure between the collar $b^1$ and the seat $a^1$. Now the screws $g$ are screwed inwardly thus fixing the sleeve $f^1$ in position. It will be understood that in the following operation of the device the play between the seat $a^1$ and the collar $b^1$ will be constant.

The construction shown in Fig. 3 will be useful both in cases in which the rod $c^1$ is subjected to accidental oscillations, and in cases in which the rod $c^1$ is intentionally rocked, for example for producing a stirring movement within the vacuum device.

In Figs. 4 and 5 we have shown a modification in which a rod 6 is mounted for being axially shiftable in a tubular extension 7 of a receptacle such as a vacuum device, the rod 6 being provided with a collar 8 loosely engaging the inner wall of the tubular extension 7. At its left hand end the tubular extension 7 is connected by a tubular portion 9 with a receptacle 10 containing a suitable liquid packing medium such as mercury. On the tubular extension 7 a sleeve 11 is axially guided by means of anti-friction bearings 12. The rod 6 is fixed to the said sleeve 11, and the tubular extension 9 passes through a slot 13 thereof.

In the operation of the apparatus the packing medium such as mercury flows from the receptacle 10 into the space 14 provided at the left of the collar 8. When moving the said rod 6 in axial direction the said liquid packing medium is alternately expelled from the space 14 and forced into the receptacle 10 and returned into the same. The collar 8 is held in loose engagement with the wall of the sleeve 7 by means of the sleeve 11 guided by means of the anti-friction bearings 12 on the outer wall of the tubular extension 7, the anti-friction bearings 12 relieving the pressure of the collar 8 on the inner wall of the tubular extension 7.

The construction shown in Figs. 4 and 5 may be combined with any one of the constructions shown in Figs. 1 to 3. When combining the constructions shown in Figs. 3 and 4 to 5, the rod is capable to perform three different movements, viz an axial movement, rotary movement and rocking movement.

It may be remarked that in addition to the positions shown in the figures vertical or inclined positions of the rod are possible. Further, the conical faces $a$ and $b$ may be arranged in the reverse direction, their portion of larger diameter being located at the side of the vacuum device and the portion of smaller diameter at the outside of the device, which construction may be desirable in case of high velocities for further obstructing the passage of the packing medium between the seat $a$ and the conical collar $b$.

In the construction shown in Figs. 1 and 2 the anti-friction bearing is adapted to take up the axial forces, the cone $b$ being held co-axially within its seat by the packing medium. But in some cases an additional anti-friction bearing is provided for taking up the radial forces.

While in describing the invention reference has been made to particular examples embodying the same we wish it to be understood that our invention is not limited to the constructions shown in the drawings, and that various changes may be made in the general arrangement of the apparatus and the construction of its parts without departing from the invention.

We claim:

1. A container enveloped in a gaseous medium and containing a gaseous medium of a pressure or condition of attenuation other than that of the enveloping medium, the wall of the container being orificed, a member extending through such orifice in the wall of the container and being movable in the direction of such extension and transversely of the said orificed wall, means for securing the said member in one or another position of adjustment in the range of such movement, and a body of liquid packing medium surrounding said member and filling the space between the container wall and the said member.

2. A container enveloped in a gaseous medium and containing a gaseous medium of a pressure or condition of attenuation other than that of the enveloping medium, the wall of the container being orificed, a member extending through such orifice in the wall of the container and being movable in the direction of such extension and transversely of the said orificed wall, means for securing the said member in one or another position of adjustment in the range of such movement with a gap of correspondingly adjusted width between the said member and the chamber wall, a second chamber surrounding and enclosing such gap, and a body of liquid packing medium filling the second-named chamber.

3. A container enveloped in a gaseous medium and containing a gaseous medium of a pressure or condition of attenuation other than that of the enveloping medium, the wall of such container being provided with a circular orifice with a conical rim, a rod provided with a complementary conical collar extending through such orifice, rotatable in said orifice, and movable longitudinally, a bearing for said rod external of said chamber wall, means engaging such bearing for adjusting said rod longitudinally and securing it in one or another position of adjustment with a gap of correspondingly adjusted width between the complementary conical surfaces of orifice rim and collar upon said rod, and a body of liquid packing medium filling such gap.

4. A container enveloped in a gaseous medium and containing a gaseous medium of a pressure or condition of attenuation other than that of the enveloping medium, the wall of such container being provided with a circular orifice, a rod provided with a collar extending through such orifice, rotatable in such orifice, and movable longitudinally, to the end that the collar upon the said rod may be adjusted in its spacing from the rim of such orifice, a cylindrical member adjustably borne by the wall of the said container surrounding the said orifice in the container wall and adapted to surround the said rod when in place in said orifice, a bearing for said rod borne by said cylindrical member, the said parts being so arranged that when assembled adjustment of said cylindrical member upon the wall of the container will determine the width of a gap between the collar upon said rod and the rim of the orifice in the container wall, and a body of liquid packing filling such gap.

5. A vacuum device comprising a casing adapted to be set under vacuum and formed with a tubular extension, an annular and conical seat formed in said extension, a rod passed through said extension into said vacuum device and formed with a complementary conical collar, a bearing adjustably mounted on said extension and supporting said member, means for adjusting said bearing in its position on said extension whereby the position of said member may be adjusted and the width of the interval between collar and seat minutely varied, and a packing medium filling the gap thus produced between said collar and seat.

6. A vacuum device comprising a casing adapted to be set under vacuum and formed with a tubular extension, an annular and conical seat formed in said extension, a rod passed through said extension into said vacuum device and formed with a complementary conical collar, a cylindrical member screwing on said extension and adjustable towards and away from said seat, a bearing mounted in said cylindrical member and supporting said member, whereby the said member may be adjusted within the said tubular extension and the width of the space between seat and collar may be minutely varied, and a packing medium filling the gap thus produced between said collar and seat.

7. The herein described joint for members provided in a wall separating spaces of different pressures, comprising a wall separating the said spaces and formed with a hole providing a spherical seat, a spherical member in loose and rocking engagement with said spherical seat, a spherical bearing disposed concentrically of said seat and providing a support for said member permitting rocking movement thereof and adapted to hold the same away from its seat, and a packing medium filling the gap thus produced between said member and seat.

8. The herein described joint for members provided in a wall separating spaces of different pressures, comprising a wall separating the spaces and formed with a hole providing a seat, a member in loose engagement with said seat and movable relatively thereto, said member and wall being provided at the side of higher pressure and adjacent to said seat with a chamber adapted to contain a supply of the packing medium, positive means acting on said member and adapted to hold said member away from its seat, a packing medium between said member and its seat, and means for collecting the packing medium drawn into the space of lower pressure and returning the same to said chamber.

9. The herein described joint for members provided in a wall separating spaces of different pressures, comprising a wall separating the spaces and formed with a hole providing a seat, a member in loose engagement with said seat and movable relatively thereto, said member and wall being provided at the side of higher pressure and adjacent to said seat with a chamber adapted to contain a supply of the packing medium, positive means acting on said member and adapted to hold the same away from its seat, a packing medium within the gap thus produced between said member and its seat, a storage receptacle communicating with said chamber, and a suction pump connected with said chamber and adapted to draw a supply of packing medium from said receptacle into said chamber.

10. The herein described joint for members provided in a wall separating spaces of different pressures, comprising a wall separating the spaces and formed with a hole providing a seat, a member in loose engagement with said seat and movable relatively thereto, said member and wall being provided at the side of higher pressure and adjacent to said seat with a chamber adapted to contain a supply of the packing medium, positive means acting on said member and adapted to hold the same away from its seat, a packing medium filling the gap thus produced between said member and its seat, a pipe connected with the space of lower pressure in position for collecting packing medium drawn into the same and extending downwardly therefrom, a receptacle adapted to receive the packing medium collected through said pipe, said receptacle being connected with said chamber, and a suction pump connected with said chamber and adapted to take the packing medium from said receptacle into said chamber.

11. A vacuum device comprising a casing adapted to be set under vacuum and formed with a tubular extension, an annular and conical seat formed in said extension, a rod passing through said extension and into said vacuum device and formed with a complementary conical collar, a bearing adjustably mounted on said extension and engaging said member, means for adjusting said bearing in its position on said extension whereby the position of said member may be adjusted and the width of the interval between collar and seat minutely varied, and means for maintaining a body of packing medium on the exterior side of the meeting conical surfaces of extension and collar and submerging at all times the line which defines on the external side the meeting of these surfaces.

In testimony whereof we hereunto affix our signatures.

HUGO STINTZING.
EUGEN HUBER.